April 29, 1952     F. M. CLARK     2,594,873
ELECTRICAL CAPACITOR CONTAINING A STABILIZER
Filed April 29, 1947
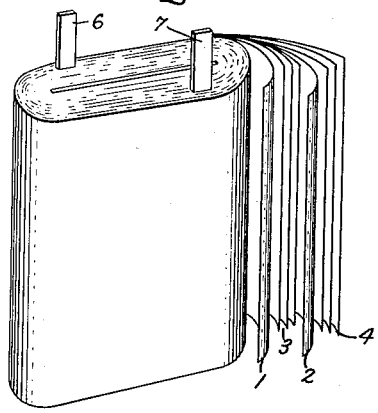
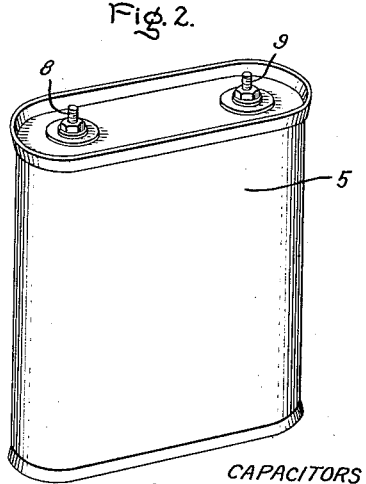
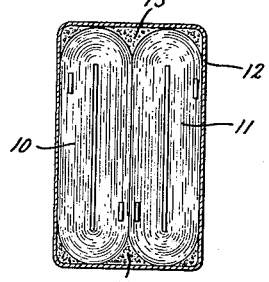
CAPACITORS CONTAIN OXYGENOUS ALUMINUM COMPOUND
Inventor:
Frank M. Clark,
by Harry E. Dunham
His Attorney.

Patented Apr. 29, 1952

2,594,873

UNITED STATES PATENT OFFICE 2,594,873

ELECTRICAL CAPACITOR CONTAINING A STABILIZER

Frank M. Clark, Pittsfield, Mass., assignor to General Electric Company, a corporation of New York Application April 29, 1947, Serial No. 744,685

4 Claims. (Cl. 175—41)

1

The present invention relates to electric capacitors and is a continuation-in-part of a prior application, Serial No. 601,676, filed June 26, 1945. The main objection of the invention is the protection of capacitors against dielectric deterioration when operated at elevated temperatures.

Capacitors are frequently employed under conditions of ambient temperatures as high as 80 to 100° C. and are desired for operation at even higher temperatures. Capacitors containing, as dielectric media halogenated hydrocarbon compounds when operated at such elevated temperatures are subject to an increase of power factor at a rate which gradually accelerates, leading to relatively early failure.

In accordance with my present invention deterioration of halogenated capacitor dielectric media is counteracted by associating such media in capacitors with a suitable oxygenous compound of aluminum, as for example, aluminum oxide or hydroxide.

In the accompanying drawing Fig. 1 is a side elevation of an embodiment of the present invention in a capacitor assembly; Fig. 2 is a perspective external view of a capacitor housing containing such assembly and Fig. 3 is a cross-section of two capacitor assemblies in a casing and being associated with a stabilizer of oxygenous aluminum compound.

Deterioration of capacitors which are impregnated with halogenated hydrocarbon containing also a nitro group in chemical combination is particularly aggravated at elevated temperature operation. For example, capacitors containing conventional paper spacers and being impregnated with tetrachlor-o-nitrodiphenyl are operable with an initial power factor of about 0.35%. When operated in 660 volt circuits under ambient temperature conditions of about 70 to 80° C., the power factor of such capacitors begins to gradually rise. Due to the accelerated deterioration, the life of a group of such capacitors at 70° C. has an average length of only about 80 days. At temperatures which do not depart greatly from ordinary room temperatures, the life of this type of capacitors under the same voltage conditions would be greater than 150 days, the power factor during operation being substantially no greater than about 0.3% for sixty cycle operation.

Capacitors containing other halogenated hydrocarbons and also a nitro group are similarly rapidly depreciated by elevated temperature operation. For example, dielectric compositions are described in my prior Patent 2,402,872, patented June 25, 1946, and comprising trichlor alpha nitro-naphthalene. Despite the improved stability inherent of the trichlor alpha nitro-naphthalene still further improvement can be obtained by the stabilizing function of oxygenous aluminum compound.

Although deterioration at elevated temperature of halogenated dielectric media is particularly aggravated when a nitro group is present in the molecular structure, marked deterioration also occurs in capacitors containing unnitrated halogenated hydrocarbon compounds. More specifically stated, the practice of my invention although particularly applicable to capacitors containing polynuclear compounds, such for example as chlorinated nitro diphenyl, chlorinated nitro diphenyl oxide, also is applicable to chlorinated polynuclear hydrocarbons which are not nitrated as for example, chlorinated diphenyl and chlorinated diphenyl oxide and to mononuclear hydrocarbon compounds, as for example, trichlorbenzene.

In the preparation of the stabilizer of my invention, a selected oxide or hydroxide of aluminum may be heated to a temperature in the range of about 350 to 500° C. in order to remove all moisture and to produce a substantially dry solid. In order to promote efficient circulation of the halogenated hydrocarbon through the stabilizer, the aluminum compound preferably should be of a size corresponding to about 30 to 60 mesh screen. This size is not critical as material of 4 to 8 mesh has been found to be of practical utility. In some instances I prefer to utilize material corresponding to materially finer mesh, as for example 80 to 300 mesh or finer. I prefer to use this fine mesh material in the smaller capacitors such as those for motor and fluorescent light power factor connection where the space available for the aluminum compound stabilizer is severely limited.

The oxygenous aluminum compound may be packed about the capacitor units within their casings, or may be introduced into the dielectric sheet material. In Fig. 1 is shown a capacitor assembly comprising armatures 1, 2 which ordinarily consist of aluminum. Between the armatures are spacers 3, 4 respectively consisting of a plurality of sheets of paper or suitable fabric. The aluminum compound may be introduced into the paper as a filler. The paper spacer ordinarily will consist of three layers of kraft tissue having a thickness of about .0004". This assembly is housed in a suitable container 5, Fig. 2, and is impregnated with a chosen halogenated hydrocarbon, for example, tetrachlor orthonitro diphenyl. Electric conductors 6, 7 lead from the armatures to external terminals 8, 9. Capacitors containing halogenated aromatic hydrocarbons and a quantity of oxygenous aluminum compound may be operated at temperatures in the range of 70 to 100° C. without having the normal life of such capacitors shortened by the high temperature operation.

In accordance with one form of my invention, the oxygenous compound of aluminum, for example, aluminum oxide or hydroxide, may be placed in otherwise void spaces in the container surrounding the capacitor winding. For this purpose the oxygenous material should be finely divided. For the larger capacitors applied on 2300 volt circuits for power factor correction the aluminum compound stabilizer is preferably of 30 to 60 mesh size. For the smaller capacitors such as are used in radio circuits and for power factor correction on motors and in fluorescent lamp applications, I have found it desirable to firmly pack finely divided 80–300 mesh material as with a vibrator into available spaces. Surprisingly, the presence of the oxygenous aluminum compound does not adversely affect the heat dissipation characteristics of the capacitor. This embodiment of my invention is illustrated by Fig. 3 which shows in cross-section a capacitor in which two capacitor rolls 10, 11 are contained in a casing 12. The aluminum oxide or hydroxide is packed around the rolls as indicated at 13, 14. With either mode of application, I have found that the desired stabilization of the halogenated impregnant is obtained.

A composition for the impregnation of capacitors may consist by weight of about 75 parts of pentachlor and 25 parts of trichlorbenzene. The composition for use on unidirectional voltage capacitors may contain also about .5 percent anthraquinone or one per cent monochlor anthraquinone, or one per cent of dichlor anthraquinone. When such mixture is aged at 100° C. the resistivity drops from an initial value of about 2670 × 10$^9$ ohms-centimeter to about 212 × 10$^9$ ohms-centimeter. As it is desirable to maintain the resistivity of capacitors for the direct current field as high as possible it was gratifying to discover that a drop of resistivity does not occur in the presence of an oxygenous aluminum compound.

Trichlor benzene as described in my prior Patent 1,944,730, patented January 23, 1934, or mixtures of trichlor benzene and 1-2-3-4 tetrachlor benzene as described in my prior Patent 2,169,872, issued August 25, 1939, when functioning as capacitor dielectrics are accompanied by a rising power factor at ambient temperatures of 70° C. and above. Capacitors impregnated therewith, when placed on 660 volts (A. C.), show such severe dielectric deterioration that dielectric failure results within 15 to 20 days.

Because of their dielectric deterioration, which is manifested by an increasing power factor, resulting in heat accumulation and the ultimate destruction of the dielectric, capacitors impregnated with trichlor benzene or a chlorinated nitro diphenyl, such as tetrachlor ortho nitro diphenyl, have heretofore been considered as seriously handicapped. The dielectric deterioration has been held to be an inescapable property of such impregnant. By the application of an oxygenous stabilizer compound of aluminum, as described, I found that this dielectric deterioration can be eliminated.

Capacitors containing three sheets of .0004 kraft capacitor tissues suitably impregnated normally are rated for use at 440 volts. A normally accepted test of quality consists of applying 660 volts to the capacitor in an ambient temperature of 70° C. Under such conditions, a suitable capacitor is expected to possess an indefinitely long life, at least exceeding 150 to 200 days.

In the absence of aluminum compound stabilizer, such capacitors when treated with trichlor benzene may fail within two weeks and possess an average life of only 15 to 20 days. When impregnated with the tetrachlor orthonitro diphenyl, the average life may be as long as 30 days but because of the dielectric deterioration which sets in even within about 10 days and is manifested in the increase in power factor, dielectric failures occur irregularly after only about 15 days on voltage test. At 440 volts, the rated voltage of the capacitor, the dielectric deterioration is equally observable in both cases but because of the lower voltage applied the life is irregularly longer but unsatisfactory for commercial use. When, however, the oxygenous aluminum compound of my invention as for example, aluminum oxide or aluminum hydroxide is present as described, the dielectric deterioration is substantially eliminated and the useful life of the capacitor indefinitely prolonged. Even under the more severe conditions of test at 660 volts and 70° C. ambient, the life of such stabilized capacitors is indefinitely long—being in excess of 300 days.

Not only chlorinated benzene and polyphenyls, but other halogenated compounds, including in particular fluorinated compounds of benzene and its alkyl derivatives, may be associated advantageously in an electric device with an oxygen compound of aluminum. Included among such alkyl derivatives are the methyl, ethyl, propyl benzenes, dimethyl benzene, methyl-ethyl benzene, and the like. In the case of all compounds containing a side chain radical, it is to be understood that the compounds to be included in the claims are those in which a nitro group and a chlorine atom, or other halogen atoms are attached to the aromatic carbon ring. In the case of compounds containing two rings, it is not essential that the nitro group and the chlorine atom or atoms should be attached to the same aromatic ring.

Although I prefer to use aluminum hydroxide heat-treated as described as the stabilizer, other oxygenous compounds of aluminum, as, for example, aluminum oxide and the oxy-hydroxides of aluminum, such as diaspore and bauxite are effective equivalents. In any event, whether using aluminum hydroxide, aluminum oxide, or oxy-hydroxides, I prefer to first heat the stabilizer as already described, in order to remove water and to promote the stabilizing activity of the aluminum compound.

The deterioration of halogenated hydrocarbons has been attributed to chemical deterioration with the formation of hydrogen halide. When the liquid is composed of chlorinated paraffin hydrocarbon and the like, formation of hydrogen chloride during operation at temperatures above room temperature is recognized. When liquid dielectric and insulating medium is composed of chlorinated aromatic hydrocarbons or their nitro derivatives experience has shown that during the normal operation of the capacitor formation of hydrogen chloride does not occur. When trichlorbenzene is heated at 100° C. in the presence of soda lime or zinc oxide, which are efficient neutralizers of hydrogen chloride, the resistivity of the trichlorbenzene is not maintained at the high value characteristically resulting from the presence of oxygenous compounds of aluminum. The formation of hydrogen chloride and its neutralization, does not appear to be the basis of the efficient stabilizing effect of an oxygenous aluminum stabilizer.

Another observation based on commercial experience in the manufacture of capacitors filled with chlorinated aromatic hydrocarbon liquid is that the resistivity drops rapidly because of its great solvency on the dielectric solid materials necessarily used in the construction of materials. This is especially true with the chlorinated benzene and with the nitro derivatives of the chlorinated mononuclear or polynuclear hydrocarbons, which are recognized as possessing a marked solvent action on resins and lignin present in the paper spacer. Adsorbents such as carbon or fuller's earth when employed for the purification of capacitor dielectric materials containing such soluble contaminants, do not act to stabilize the dielectric properties (power factor) of capacitors treated with such impregnants. Experimental data indicates that an oxygenous aluminum stabilizer does not owe its efficiency to the removal of dissolved contaminants.

What I claim as new and desire to secure by Letters Patent of the United States is:

1. An electric capacitor consisting essentially of the combination of a container, an assembly therein comprising cooperating armatures, an interposed paper spacer, and halogenated aromatic hydrocarbon containing a nitro group in molecular combination impregnating said spacer and a quantity of a compound of the class consisting of aluminum hydroxide and aluminum oxide enclosed in said container in contact with said aromatic hydrocarbon.

2. An electric capacitor comprising the combination of cooperating armatures, a paper spacer therebetween, an impregnant in said paper consisting of a chlorinated polynuclear hydrocarbon containing a nitro group attached to an aryl nucleus of said hydrocarbon and a quantity of a compound of the class consisting of aluminum hydroxide and aluminum oxide in physical contact with said halogenated hydrocarbon.

3. An electric capacitor comprising the combination of cooperating armature, a paper spacer therebetween, an impregnant consisting of chlorinated nitro diphenyl and a quantity of a compound of the class consisting of aluminum hydroxide and aluminum oxide in physical contact with said chlorinated diphenyl.

4. An electric capacitor comprising the combination of cooperating armature, a dielectric spacer therebetween, a liquid dielectric consisting of tetrachlor orthonitro diphenyl and a quantity of a compound of the class consisting of aluminum hydroxide and aluminum oxide in physical contact with said chlorinated diphenyl.

FRANK M. CLARK.

REFERENCES CITED

The following references are of record in the file of this patent:

UNITED STATES PATENTS

| Number | Name | Date |
| --- | --- | --- |
| 1,966,163 | Clark | July 10, 1934 |
| 1,994,302 | Clark | Mar. 12, 1935 |
| 2,036,274 | Holler | Apr. 7, 1936 |
| 2,077,429 | McMahon | Apr. 20, 1937 |
| 2,370,113 | Jenkins | Feb. 20, 1945 |
| 2,391,686 | McLean | Dec. 25, 1945 |

FOREIGN PATENTS

| Number | Country | Date |
| --- | --- | --- |
| 545,500 | Great Britain | May 29, 1941 |